March 12, 1957
W. H. ELLIOT
2,785,368
ELECTRONIC MOTOR CONTROLLERS
Filed Jan. 25, 1954
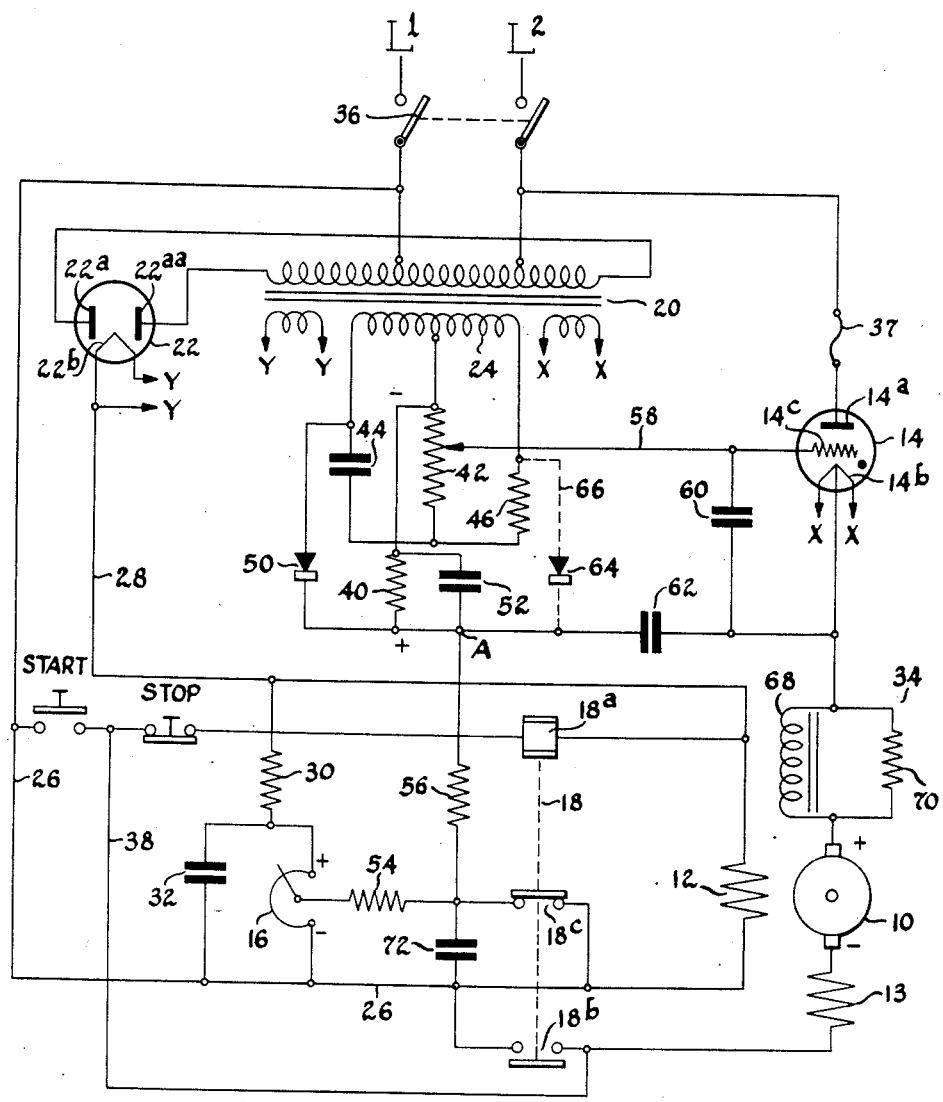
Inventor
William H. Elliot
By W. C. Dixon
Attorney

United States Patent Office

2,785,368
Patented Mar. 12, 1957

2,785,368

ELECTRONIC MOTOR CONTROLLERS

William H. Elliot, Whitefish Bay, Wis., assignor to Cutler-Hammer, Inc., Milwaukee, Wis., a corporation of Delaware Application January 25, 1954, Serial No. 405,746

4 Claims. (Cl. 318—331)

This invention relates to electronic motor controllers; and, it relates particularly to systems in which motor speed is controlled as a function of the difference between a reference voltage and the counter electromotive force of the motor armature.

A primary object of the invention is to provide an electronic motor control system which combines simplicity and low cost with a high degree of accuracy of control.

Another object of the invention is to provide an improved phase-shift circuit, improved means for form factor correction and improved means for developing a reference voltage, and further to provide a controller in which the aforesaid improvements may be inexpensively incorporated and combined.

Other objects and advantages of the invention will hereinafter appear.

The accompanying drawing, which illustrates diagrammatically one embodiment of the invention, will now be described, it being understood that modifications in the embodiment illustrated and other embodiments are possible without departing from the spirit of the invention or the scope of the appended claims.

Referring to the drawing, the motor to be controlled comprises an armature 10 and a field winding 12. It may be provided with a series field 13. Unidirectional current is supplied to armature 10 from an alternating current source, such as lines L1 and L2, through a thyratron tube 14. Unidirectional current is supplied to field winding 12, to a speed-setting potentiometer 16 and to the operating winding 18$^a$ of a control relay 18 from lines L1 and L2 through an autotransformer 20 and a rectifier tube 22. A centertapped secondary winding 24 of the transformer 20 is connected to supply alternating current to a phase-shift circuit and a rectifier in which are developed grid control voltages for the thyratron 14.

The energizing circuit for field winding 12 may be traced from line L1, through a conductor 26, through field winding 12, through conductor 28 and thence through full-wave rectifier tube 22 from cathode 22$^b$ to anodes 22$^a$ and 22$^{aa}$ and autotransformer 20 and line L2. Operating winding 18$^a$, a normally closed "stop" switch and a normally open "start" switch are connected in series in that order from conductor 28 to conductor 26. A resistor 30 and speed setting potentiometer 16 are connected in series between conductors 28 and 26. Thus field winding 12, operating winding 18$^a$ and potentiometer 16 are connected to be energized in parallel through tube 22. A filter capacitor 32 is connected in parallel with potentiometer 16 to smooth the voltage drop across the latter.

The energizing circuit for armature 10 may be traced from line L2, through a fuse 37, through tube 14 from anode 14$^a$ to cathode 14$^b$, and thence through a form factor correction circuit 34, armature 10, normally open contacts 18$^b$ of relay 18 and conductor 26 to line L1.

Field winding 12 and potentiometer 16 are energized through tube 22 when line switches 36 are closed. Armature 10 is energized when the "start" switch is closed to energize coil 18$^a$ and close contacts 18$^b$. Thereafter coil 18$^a$ is maintained energized by a maintaining circuit consisting of a conductor 38 which bridges the connection between the "stop" and "start" switches with the connection between contacts 18$^b$ and armature 10.

During operation of the controller, the motor field current is not adjusted. The motor armature current is varied, by control of the conduction through tube 14, to control motor speed.

Four separate voltages are applied between the cathode 14$^b$ and the control electrode 14$^c$ to control conduction through tube 14. These voltages are the counter electromotive force of the motor armature, a selected portion of the unidirectional voltage drop across potentiometer 16, a unidirectional voltage developed across resistor 40 and a portion of the alternating voltage which is developed across potentiometer 42. This alternating voltage lags the voltage between lines L1 and L2 by approximately 120 electrical degrees.

The phase-shift circuit comprises transformer winding 24, a capacitor 44 and a resistor 46 connected in a loop circuit. It further comprises a voltage divider or potentiometer 42 which is connected from the centertap of winding 24 to the connection between capacitor 44 and resistor 46.

Resistor 40 is connected from the centertap of winding 24 to a circuit point A. A half-wave rectifier unit 50 is connected between point A and the connection between winding 24 and capacitor 44. Thus, the left one-half of winding 24, rectifier 50 and resistor 40 are connected in a loop rectifier circuit, a unidirectional voltage is developed across resistor 40 and a filter capacitor 52 acts to maintain this voltage constant.

The cathode-control electrode circuit of the tube 14 may be traced from cathode 14$^b$ through network 34 to the positive terminal of armature 10, from the negative armature terminal through contacts 18$^b$ and conductor 26 to the negative end of potentiometer 16, from the potentiometer tap through resistors 54 and 56 to point A at the positive end of resistor 40 and through resistor 40, that portion of potentiometer 42 from centertap of winding 24 to the tap of potentiometer 42 and conductor 58 to control electrode 14$^c$. A capacitor 60, connected between control electrode 14$^c$ and cathode 14$^b$ and a capacitor 62, connected between point A and cathode 14$^b$, act as filters to smooth out abrupt voltage changes.

In this circuit the unidirectional voltage drop across resistor 40 is in series opposition to the unidirectional voltage drop across potentiometer 16 from its tap to conductor 26. Together these voltages form a reference voltage for comparison with the counter electromotive force of the armature. The voltage drop across potentiometer 16 is greater than the voltage drop across resistor 40 so that, by adjustment of the potentiometer 16, the reference voltage polarity and amplitude may be adjusted to cause the alternating potential applied to control electrode 14$^c$ to intersect the critical control electrode potential of thyratron 14 at any desired point in the conducting half cycle of the thyratron anode supply voltage.

Potentiometer 42 may be adjusted to vary the amplitude of the alternating grid control voltage. A change in the amplitude of this voltage has the effect of changing the system amplification by altering the steepness of the alternating voltage wave front. Thus the effect of adjusting potentiometer 42 is to adjust the sensitivity and the load regulation of the system. In certain applications, the sensitivity required is fixed and a fixed voltage divider may be employed. In other applications, such for example as in a conveyor system driven at variable speed by a plurality of motors, it is desirable that the load regulation of the system may be adjusted to insure equal division of the load between motors. In addition to permitting adjustment of system sensitivity at any predetermined fixed value or an adjustable value, potentiometer 42 eliminates the need for a separate grid leak resistor.

The rectifier 50 is connected in series with resistor 40 across the left one-half of winding 24, as shown, so that any ripple in the voltage across resistor 40 will have proper phase relationship with the voltage across lines L1 and L2 and will not affect adversely firing of tube 14. If desired a rectifier 64 may be connected across resistors 40 and 46, as shown by dotted conductor 66, to form a full-wave rectifier circuit with rectifier 50.

Network 34 includes a reactor 68 and a resistor 70 connected in parallel. This circuit has been demonstrated to result in greater correction of the form factor of the armature current pulses than does the conventional circuit in which a reactor and a back rectifier are connected in series in shunt with the motor armature. This improvement is especially desirable because motor heating is proportional to current squared and because it permits the use of half-wave armature supply systems to control some motors of a size heretofore required to be supplied by full-wave supply systems.

Network 34 will serve to correct the form factor of the armature current pulses wherever it is connected in the motor armature circuit. However, if the voltage variations thereacross which result from changes in armature current are to be compensated for by the feed-back loop, the network 34 must be connected in that portion of the armature circuit which forms a part of the control electrode-cathode circuit of tube 14.

Timed acceleration of the motor is provided by a capacitor 72 connected to be charged in parallel with resistor 54 and that portion of potentiometer 16 from its tap to conductor 26. Until the armature circuit is energized by closure of contacts 13$^b$, capacitor 72 is maintained discharged by normally closed contacts 13$^c$ which shunt it. When contacts 13$^c$ are opened the motor is accelerated as a function of the time in which capacitor 72 is charged through resistor 54.

I claim:

1. In combination, an alternating current source of supply, a thyratron tube, a motor having an armature connected in series with the anode and cathode of said tube across said source, phase-shift circuit means comprising a centertapped winding coupled to said source and voltage divider means connected to said centertap, rectifier means comprising said centertapped winding and a rectifier unit and a load resistor connected to said centertap, an auxiliary source of reference voltage, and control circuit means for said thyratron comprising, in series circuit between the cathode and control electrode of said tube, said armature, said auxiliary source, said load resistor, said centertap and a portion of said voltage divider, said load resistor and armature being connected so that their respective voltages are added and together oppose the voltage across said auxiliary source.

2. The combination defined in claim 1 in which a form factor correction circuit comprising the parallel combination of an inductive reactor and a resistor is connected in series with said tube and said armature across said source.

3. In a thyratron control circuit for varying the armature current of an electric motor to control the speed thereof comprising an alternating current supply source, a thyratron tube having an anode, a cathode and a control electrode, means for connecting said anode and cathode and the armature in series across said source, and rectifier means connected to said source for supplying constant energization to the field winding of the motor, in combination, means for controlling conduction of said thyratron tube comprising means connected to said rectifier means affording an adjustable source of control voltage, a centertapped winding inductively coupled to said supply source, a phase-shift circuit comprising a resistor and a reactor series connected across said winding and a voltage divider connected intermediate said centertap and the junction of said resistor and reactor and having an adjustable tap for applying to said control electrode an adjustable alternating current voltage, a rectifier and a load resistor connected between one end of said winding and said centertap, and circuit means connecting said load resistor, said adjustable source and the armature to said control electrode so that the algebraic sum of the voltage across said load resistor and the voltage of said adjustable source form a reference voltage for comparison with the armature voltage.

4. In an electrical motor controller having an alternating current supply source and an electrical discharge device comprising a control electrode and comprising an anode and a cathode series connected with said source and the motor armature, in combination, a centertapped winding, phase shift means connected to said winding and including a voltage divider connected to said centertap for applying to said control electrode a phase displaced adjustable alternating voltage, rectifier circuit means connected to one end and the centertap of said winding and comprising a resistor for applying to said control electrode a unidirectional voltage, means coupled to said source affording an adjustable voltage in opposition to said unidirection voltage to develop a reference voltage, and means for comparing said reference voltage with the voltage across the armature to control conduction in said discharge device.

References Cited in the file of this patent

UNITED STATES PATENTS

| | | |
|---|---|---|
| 2,167,530 | Schneider | July 25, 1939 |
| 2,175,009 | Anderson | Oct. 3, 1939 |
| 2,235,551 | Garman | Mar. 18, 1941 |
| 2,264,333 | Satterlee | Dec. 2, 1941 |
| 2,460,064 | Curtis | Jan. 26, 1949 |
| 2,546,014 | Puchlowski et al. | Mar. 20, 1951 |
| 2,559,724 | Lobosco | July 10, 1951 |
| 2,630,555 | Hursch | Mar. 3, 1953 |